US008624970B2

(12) United States Patent
Krobath

(10) Patent No.: US 8,624,970 B2
(45) Date of Patent: Jan. 7, 2014

(54) METHOD FOR DISPLAYING ROUTE INFORMATION

(76) Inventor: Thomas Krobath, Zell am See (AT)

( * ) Notice: Subject to any disclaimer, the term of this patent is extended or adjusted under 35 U.S.C. 154(b) by 1650 days.

(21) Appl. No.: 11/659,874

(22) PCT Filed: Aug. 9, 2005

(86) PCT No.: PCT/AT2005/000322
§ 371 (c)(1),
(2), (4) Date: Feb. 27, 2007

(87) PCT Pub. No.: WO2006/015399
PCT Pub. Date: Feb. 16, 2006

(65) Prior Publication Data
US 2007/0257984 A1 Nov. 8, 2007

(30) Foreign Application Priority Data

Aug. 10, 2004 (AT) ................. A 1363/2004

(51) Int. Cl.
*H04N 5/46* (2006.01)
(52) U.S. Cl.
USPC ......... 348/116; 348/113; 709/200; 455/556.1
(58) Field of Classification Search
USPC ................ 348/113, 116; 701/200–202, 206, 701/207–211; 709/200; 455/41.2, 556.1
See application file for complete search history.

(56) References Cited

U.S. PATENT DOCUMENTS

| | | | |
|---|---|---|---|
| 5,862,270 A | 1/1999 | Lopresti et al. | |
| 6,205,396 B1 | 3/2001 | Teicher et al. | |
| 6,321,158 B1 * | 11/2001 | DeLorme et al. | 701/201 |
| 6,371,373 B1 | 4/2002 | Ma et al. | |
| 6,424,264 B1 | 7/2002 | Giraldin et al. | |
| 6,622,088 B2 * | 9/2003 | Hood | 701/211 |
| 6,924,741 B2 * | 8/2005 | Tamayama et al. | 340/572.1 |
| 7,375,634 B2 * | 5/2008 | Sprague | 340/572.1 |
| 7,496,445 B2 * | 2/2009 | Mohsini et al. | 701/206 |
| 2002/0067259 A1 | 6/2002 | Fufidio et al. | |
| 2002/0123843 A1 * | 9/2002 | Hood | 701/211 |
| 2002/0179709 A1 * | 12/2002 | Mehler | 235/454 |
| 2003/0197612 A1 * | 10/2003 | Tanaka et al. | 340/572.1 |
| 2004/0034466 A1 * | 2/2004 | Hood | 701/200 |

FOREIGN PATENT DOCUMENTS

| | | |
|---|---|---|
| DE | 24 25 893 A | 3/1976 |
| DE | 44 31 780 A1 | 3/1996 |
| DE | 195 23 508 | 1/1997 |
| DE | 197 52 104 A1 | 5/1999 |

(Continued)

OTHER PUBLICATIONS

Austrian Search Report dated Mar. 31, 2005 with English translation of the relevant parts.

*Primary Examiner* — El Hadji Sall
(74) *Attorney, Agent, or Firm* — Collard & Roe, P.C.

(57) ABSTRACT

The invention relates to a method for displaying route information for individuals located within a predetermined area, route information units being provided at a plurality of orientation points. The inventive method comprises the following steps: -an individual is identified and at least one destination is defined to which the individual is to be guided; -the individual is detected at least at one route information unit; -information on the route the individual has to take to the desired destination is displayed, the individual being identified in a contactless manner. The invention further relates to a device for displaying route information for individuals.

13 Claims, 2 Drawing Sheets

(56) References Cited

FOREIGN PATENT DOCUMENTS

| DE | 100 25 332 | A1 | 11/2000 |
| DE | 100 59 153 | A1 | 6/2002 |
| DE | 202 02 616 | U1 | 8/2002 |
| DE | 102 05 080 | A1 | 5/2003 |
| EP | 1 394 760 | A1 | 3/2004 |

* cited by examiner

METHOD FOR DISPLAYING ROUTE INFORMATION

CROSS REFERENCE TO RELATED APPLICATIONS

Applicant claims priority under 35 U.S.C. §119 of Austrian Application No. A 1363/2004 filed Aug. 10, 2004. Applicant also claims priority under 35 U.S.C. §365 of PCT/AT2005/000322 filed Aug. 9, 2005. The international application under PCT article 21(2) was not published in English.

The present invention relates to a method for displaying route information for individuals within a predetermined area.

The orientation of individuals in large buildings, building complexes, or also larger areas is a problem which has not yet been adequately solved. Equipping such areas with general information units, such as route maps, is typically not capable of ensuring navigation of the individuals to their selected destinations without problems. In order to solve this problem, it has been suggested that the individuals be provided with navigation aids which display information to reach the desired destination. Such personal guiding systems are described in DE 202 02 616 U, DE 100 59 153 A, and DE 197 52 104 A. These solutions have the disadvantage that devices must be provided for a large number of individuals, which have a communication interface and, in addition, have display unit, which outputs the information for the particular individual. Such personal guiding systems are therefore very expensive and may not be implemented in many cases for cost reasons.

Various route information systems are known, in which an identification means, such as a magnetic card, must be inserted into a corresponding information unit to obtain a route display. Such solutions are described, for example, in DE 24 25 893 A or DE 44 31 780 A. These systems always require active manipulation by the individual at the points at which route information is desired and needed. Furthermore, it is necessary to transfer or provide the identification means directly, i.e., physically, to the user, so that certain restrictions result in the application here.

The object of the present invention is to specify a method, using which individuals may be securely and reliably supplied with information in order to reach their desired destinations and to implement this method in such way that the apparatus outlay for implementation is as small as possible. The dwell time of the individual in front of the route information units is to be kept as low as possible.

A further object of the present invention is to design the method as simply as possible for the participating individuals and to minimize the personnel outlay which is required for performing the method. In particular, the transfer of the identification means is to be designed as simply as possible and all routes for organizational execution are to be kept open.

Furthermore, it is an object of the present invention to specify a device which allows the method to be performed in a simple and cost-effective way.

In the method according to the present invention, to achieve the object stated above, route information units are first provided at multiple orientation points within the predetermined area. Those points at which an orientation is necessary, because there are multiple possibilities for the further route, such as intersection points or route forks, are referred to as orientation points.

Specifically, the following steps are executed in the method according to the present invention:
identifying an individual and establishing at least one destination to which the individual wishes to be guided;
detecting the individual at least one route information unit;
displaying information about the further route of the individual to the desired destination.

According to the present invention, the identification of the individual is performed in a contactless way. Contactless in the meaning of the present invention means, for example, visual scanning of an information carrier which may be performed in principle over a specific distance, even when it is possible to hold the information carrier so close to a read device that there is physical contact.

Using the achievement of the object according to the present invention, it is possible to make obtaining the information significantly easier, without coming into physical contact with the corresponding device. In addition, because of the shorter dwell time of the individuals in front of the device, the capacity is significantly increased, by which a significantly larger number of individuals may be given appropriate information in a given time unit using a device.

The identification of an individual does not necessarily mean in the method according to the present invention that the individual has to legitimize himself, i.e., that his name, address, or other data is to be determined. Identification in the meaning of the present invention solely means that the individual is made recognizable for the time in which the route information is to be offered. This is expediently performed upon entering the corresponding area. On his way to the desired destination, the individual repeatedly comes to the route information units distributed in the area to obtain further information about the route. The detection of the individual at the route information units is performed, for example, automatically when the individual approaches the route information unit to a predetermined extent, or by active handling of the individual, such as laying the hand on a corresponding recognition device. After the individual has been detected at the route information unit in this way, the information determined personally for the particular individual about the further route to the destination is provided.

It is to be noted that establishing the destination may be an input procedure, but may also be performed in that identification occurs at a specific location, by which this location is established as the destination.

In a first group of preferred embodiment variations of the method according to the present invention, the individuals are identified by an identification apparatus which they receive at the beginning. In an especially advantageous variation in this context, the identification is performed via the input of a voucher which carries a two-dimensional barcode. This achievement of the object overcomes the restriction that an information carrier must be physically handed out or provided to the user. In this way, it is not only possible to use an ID card, an airline ticket, a parking card, or the like as an identification apparatus or as a carrier for such an identification apparatus, but the barcode may also be transmitted by fax, e-mail, or the like, which makes the organizational execution significantly simpler. Furthermore, it is possible to transfer the barcode as to a mobile telephone an image data set, so that the display of the mobile telephone is used as an identification apparatus.

This barcode comprises a combination of black and white rectangles. Each panel symbolizes one bit. The code is input using an image scanner suitable for this purpose. Corresponding security criteria may also be fulfilled by the information content, which is increased significantly in relation to typical barcodes. The information transmission via such a two-dimensional barcode is known per se, reference is made here to U.S. Pat. No. 5,862,270 A and DE 100 25 332 A only for exemplary purposes.

This identification apparatus may alternatively be implemented as an RFID chip, for example, which allows unique identification wirelessly and in many embodiment variations also permits the storage of data. It is essential to the present invention that the identification apparatuses are very cost-effective, since they do not contain any type of display units or the like. In the case of RFID chip, no separate power supply is necessary either. Such an RFID chip does not necessarily have to be provided as an object intended specifically as an orientation aid, it may also be implemented in a parking or airline ticket, a mobile telephone, or other objects for another purpose and may merely also be used for navigation.

Alternatively and/or additionally thereto, it is also possible that the individual is biometrically measured upon the identification. This may be performed in manifold ways. The measurement may thus be performed photographically, in that an image of the individual is produced, which is used for further recognition. As an alternative, for example, a hand of the individual may be measured to allow the identification. The route information units are correspondingly implemented to recognize the individual as needed.

There are two alternative embodiment variations for the method according to the present invention in regard to the information stored. In the first embodiment variation, the personal route information is stored in the identification apparatus. This means that every identification apparatus receives all required information about the route of the particular individual to the destination desired by him. This is a table, for example, which contains the appropriate output for each route information unit, which is displayed or output when the individual is located at the relevant route information unit. This embodiment variation of the method according to the present invention has the advantage that the individual route information units do not need to be connected to the central unit. It is solely necessary for the route information units to input the information stored in the identification apparatus upon detecting an individual and to display the particular relevant information. This may be implemented in such a way that the stored information contains a table in which the route information appropriate for reaching the desired information is stored in each individual route information unit. The only logic required in the route information unit is to take and display the entry from this transmitted table which relates specifically to this route information unit. In this way, it is possible to implement the individual route information units especially simply and cost-effectively, and, in particular, it is not necessary to provide a network connection.

In an alternative variation of the method according to the present invention, the route information is stored centrally for all individuals. In this case, it is possible to implement the identification apparatus especially simply, since it only has to store a single data set, namely a code which identifies the identification apparatus and thus is used for recognizing the individual. After the individual is detected, a corresponding query is sent by the route information unit to the central unit, which calculates the required output or display on the basis of the destination stored for this individual and returns it to the route information unit, which displays or outputs it. In this embodiment variation, networking of the route information units with a central unit is clearly necessary.

Furthermore, performing the method according to the present invention may be simplified and made easier by deriving the route information automatically from personal data which is obtained by legitimizing the individual. In many cases, the individual himself does not know his precise destination upon entering the area. Thus, for example, in an official building, the referring person responsible for the individual and his office must first be ascertained, or, in a hospital, the visitor must first find out the location of his relative to be visited. If the individual is not only identified upon entering the area, but rather also legitimized, by inserting an ID card, a credit card, or the like in a corresponding read unit, for example, in many cases the destination may be derived automatically from existing data or support in finding out the correct destination may at least be provided automatically. This means that the personnel outlay for information booths or counters, which advise the individuals in finding out their particular destinations, may be minimized.

It is especially favorable if, after reaching the destination, route information is offered which relates to the return route of the individual. This is advantageous, for example, if the route to a motor vehicle parked in a parking garage is displayed after an airplane journey.

In the method according to the present invention, the route information may be displayed in manifold ways. A graphic display by arrows, map details, or other graphic illustrations of the particular surroundings is preferred. In addition thereto, information may be offered in verbal form (written or acoustic), such as the output: "third door on the left". Depending on the intended purpose, the information may also be offered acoustically. In the two latter variations, of course, it is possible to output information in various languages as selected by the using individual.

Furthermore, the present invention relates to a device for displaying route information for individuals within a predetermined area having a central unit, in which information about the topography of the area is stored, and having multiple route information units provided at orientation points. According to the present invention, this device is characterized in that at least one identification apparatus is provided for identifying the individual and inputting a destination, and the route information units are implemented for the purpose of detecting the individual and, after detection, displaying information about the further route of the individual to the desired destination.

In the following, the applicability of the method according to the present invention is explained on the basis of examples.

EXAMPLE 1

This exemplary embodiment relates to a parking garage, in which a parking card is output as usual upon entry. This card is equipped with a writable RFID tag. A route information unit is situated in each group or row of parking places, at which the driver identifies himself after parking the vehicle by bringing the parking card into the detection area of the route information unit. The RFID tag on the parking card is thus written with the position data of the route information unit and then contains all required route information to reach the position of the route information unit at the parking place from an arbitrary route information unit.

Upon the exit from the parking garage, the route to the parked motor vehicle may be displayed on all route information units, e.g., by direction arrows and output of: "your car is located in parking garage 2, level 4, row 12."

It is clear that the cashier may be built integrated with a route information unit.

The individual route information units do not need to be networked in this exemplary embodiment and store no information besides their own number.

EXAMPLE 2

In this exemplary embodiment, the object is to make it easier for multiple individuals to orient themselves in a hospital. These individuals may be patients who wish to find a specific treatment room, independently of whether these patients are under stationary or ambulatory care. Further individuals whose orientation is to be supported are associates who wish to visit the patients, but also further individuals, such as suppliers, pharmaceutical representatives, and the like.

Identification units are provided in the entry area of the hospital, which perform a biometric measurement of the individual, by producing video images of the face, for example, and also provide automation-supported information about the desired destination. Thus, for example, the name of an individual to be visited may be input via a keyboard. If necessary, auxiliary personnel are available to help in determining the desired destination.

However, it is also possible, in the event of possible notifications of associates, to provide them with a two-dimensional [word missing], by including it with a fax, e-mail, or the like. The special advantage is that in this case no further manipulation is necessary.

After the destination has been established, starting information is displayed, such as the number of the desired room and statements about the first route section. In further sequence, the individual moves toward the desired destination, while being able to "ask" a route information unit about the further route every time when he is not clear about the further route. These route information units are distributed over the entire area of the hospital and in particular at intersections and branches. As soon as the individual is located in the detection area of a recognition unit, he is identified and a corresponding query is sent to a central unit via the network. The desired destination for this individual is stored in the central unit and the further route may thus be calculated and sent back to the route information unit, which displays it. The special advantage of this system is that even when the individual has left the predefined and/or suggested route, correct route information is always displayed. A further advantage is the fact that even if the target individual has moved in the time between the transmission of the identification data (e.g., the 2D barcode) and the actual visit of the individual, the correct route information may still be displayed. This would not be the case if only the target address, such as the room number, was transmitted to the individual.

EXAMPLE 3

This example relates to making the orientation in an airport and/or airport vicinity easier. Individuals who set out on an air journey, for example, receive an RFID tag with their airline ticket, which is incorporated in the airline ticket, for example. A 2D barcode may be used for this purpose in the same way, which has the advantage that even airline tickets which have been booked online and printed out by the passenger are usable.

As soon as the individual has parked his motor vehicle in a parking garage, he may register at a route information unit located nearby by bringing the airline ticket into the detection area of a transceiver unit. The location at which the motor vehicle is parked may thus be stored at a central unit and the individual may thus be returned thereto if needed. In further sequence, the individual is first guided to the correct check-in counter and then to the correct gate, which is possible if the central unit has access to the corresponding data. A further special advantage of this embodiment variation is that the route information units may also output relevant data for the affected individual, such as the current delay of the relevant flight and the like.

Further advantages of this achievement of the object are that the whereabouts and approximate location of individuals who have out a specific flight may be established, so that the decision as to whether or not an aircraft is to wait on these individuals is made easier. The search for specific individuals who are on their way to the target location is also thus made easier. A further additional functionality is that specific individuals whose flight is directly before the end of the boarding phase are directed to special counters having accelerated processing during check-in or security checks to avoid delays.

As noted above, the individual may be guided to the parking place of his motor vehicle after ending the aircraft journey.

EXAMPLE 4

This exemplary embodiment relates to the navigation of individuals in department stores, trade shows, and the like. Initially, an RFID tag is handed out to the individual and the individual may input one or more destinations in a corresponding input device. In the case of the department store, this may be a list of products to be purchased, in the case of a trade show, a list of presenters to be sought out. The route information units then show the individual a route through the department store or the trade show to reach the relevant shelves or trade show stands. If needed, a route optimization may be performed by the central unit to minimize the overall route length.

However, it is also possible for the individual to prepare a shopping list in an electronic catalog without officially ordering the products. The individual may print out a two-dimensional barcode at home together with the shopping list, which the system prepares, and thus identify himself upon the actual visit to the department store.

The present invention is explained in greater detail in the following on the basis of the exemplary embodiments illustrated in the figures.

Figure 1:
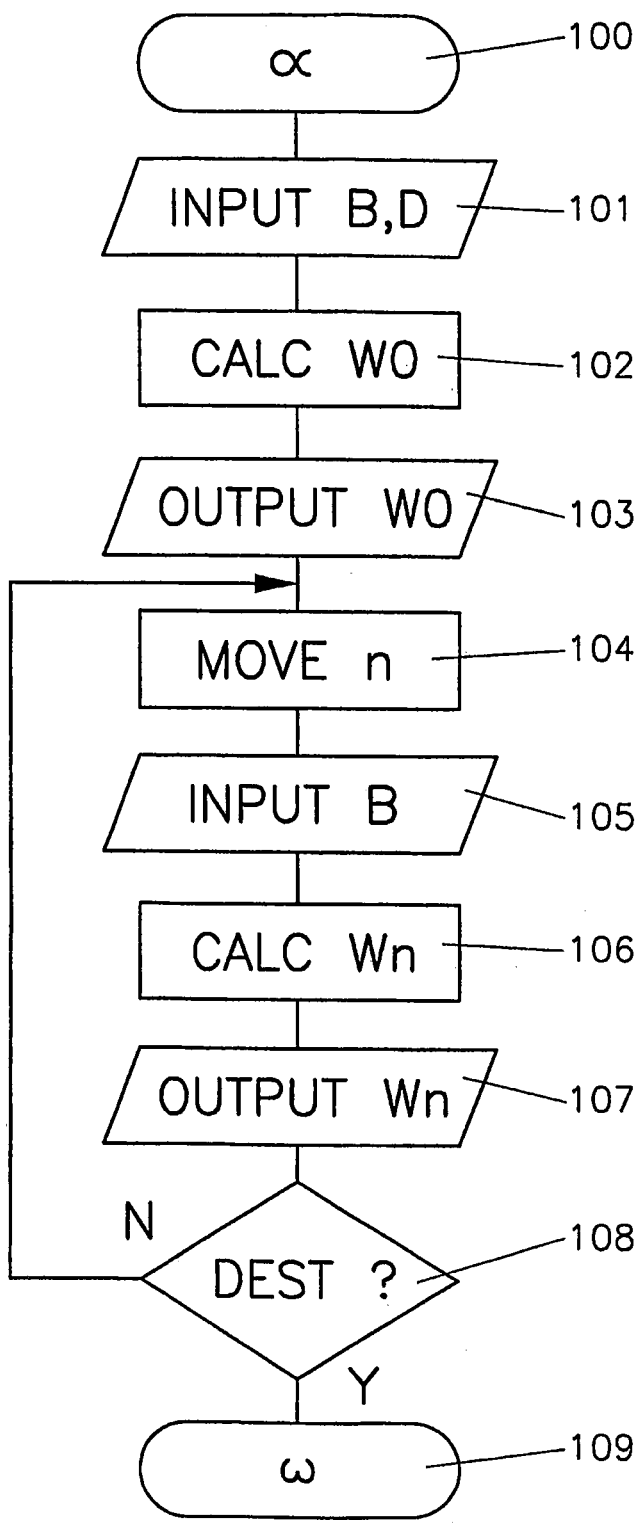
FIG. 1 shows a flowchart which displays the sequence of the method of the first embodiment variation.

In the flowchart of FIG. 1, the method is begun in step 100, in which the individual enters the area, which is a hospital as in the above example 1. In step 101 (INPUT B, D) an identification of the individual is performed in a reception area. Biometric data B of the individual is detected, for example, by facial recognition methods. Furthermore, the desired destination D of the individual is input, i.e., a specific treatment room for a treatment or a hospital room in which a visit is to occur. The input may be performed by the individual himself in that he inputs the required data at a terminal, such as the name of the individual to be visited, or by personnel at an information counter.

First route information W0 is calculated in step 102 (CALC W0) and output in step 103 (OUTPUT W0). This contains general information, such as the number of the room representing the destination, and information about the initial route section. The information may be verbal, such as the output: "go straight ahead to the elevator" or nonverbal, in the form of arrows or pictograms.

The individual moves further in the area in next step 104 (MOVE n), it being unimportant for the method whether the individual follows the information received, or deviates therefrom for whatever reason. As soon as the individual has the need for further information, he may identify himself at the next route information unit, by entering the detection area of the facial recognition unit, for example. Therefore, in step 105 (INPUT B), the biometric data is input again, and in step 106 (CALC Wn), the suitable route information for the nth route section is calculated from the current location. In step 107 (OUTPUT Wn), this information is output. In step 108 (DEST ?), it is decided whether the desired destination has been reached and, if not, the program returns to step 104. If the desired destination has been reached, the program ends in step 109.

After reaching the destination D, in an embodiment variation not shown in this flowchart, the exit of the hospital may be established as the new destination, in order to lead the individual to the exit analogously to the method described above.

Figure 2:
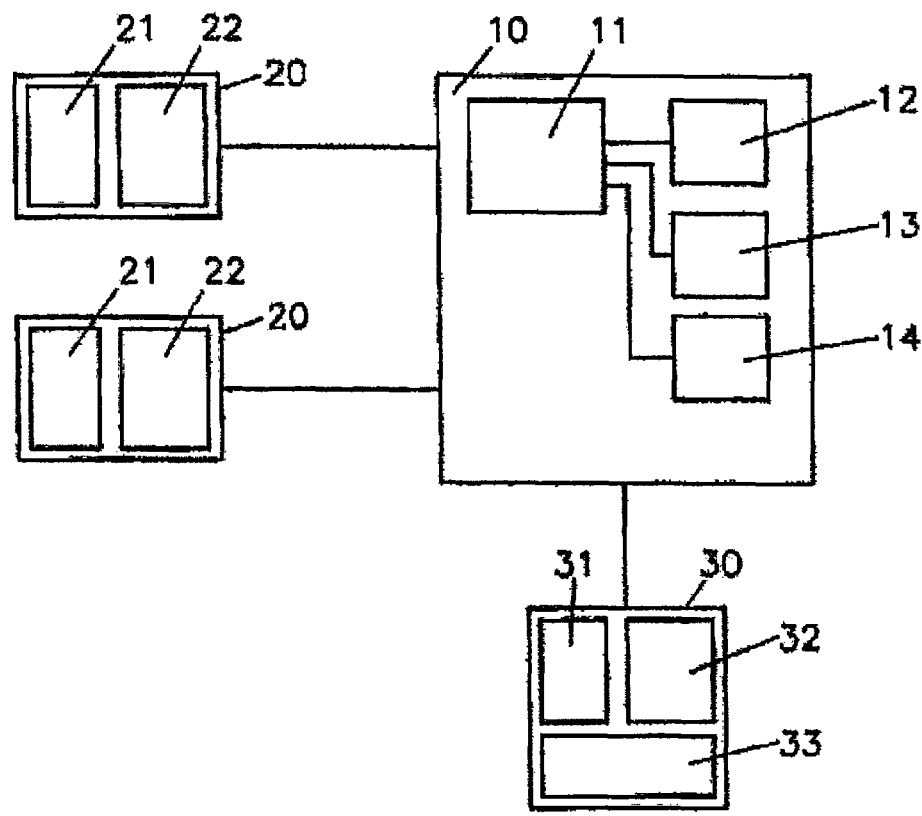
FIG. 2 shows a block diagram of a first variation of the device according to the present invention.

FIG. 2 shows the components required for the system in the form of a block diagram. A central unit 10 has a calculation unit 11, a first memory 12, a second memory 13, and a third memory 14. The general information about the relevant area, such as the topography and other information relevant for performing the method, is stored in the first memory 12. In the concrete example, these are the individual rooms of the hospital, their position, and the modes of transportation available, such as passages, staircases, and elevators. In addition, the first memory 12 receives data about the whereabouts of all patients and the like.

The second memory 13 contains the data input in step 101, i.e., the biometric data B and the data D about the desired destination. Information about the movement of the individual up to this point is collected in the optional third memory 14, in order to be able to establish, for example, whether or not impermissible or undesired movements exist and/or to allow the individual to find previously visited locations again.

The required calculations are performed in the calculation unit 11.

The central unit 10 is connected to multiple route information units 20, each of which comprises a recognition unit 21 and a display unit 22, for example, in the form of a display screen. Furthermore, the central unit 10 is connected to an identification unit 30, which has a measuring unit 31, a display unit 32, and an input unit 33.

It is obvious that the procedure may be performed essentially analogously using RFID tags instead of biometric detection. Very simple RFID tags may be used, which solely output an identification number upon request.

Figure 3:
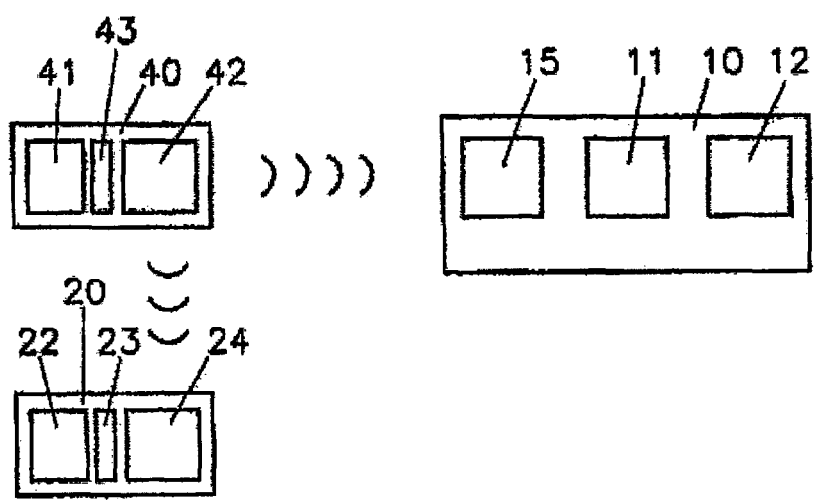
FIG. 3 shows a block diagram of a further variation of the device according to the present invention.

The embodiment variation of FIG. 3 shows an example in which the identification of the individual is performed by a more complex RFID tag 40, which has a first memory 41, a nonvolatile memory 43, and a transceiver unit 42.

In step 101, a communication link is produced to the central unit 10, which is provided here with a transceiver unit 15, and all data relevant for the navigation is input into the first memory 41. During the navigation, route information may be called up at all route information units 20 which are sought out. This is performed in that a transceiver unit 24 of the route information unit 20 assumes contact with the RFID tag 40 as the communication interface. The RFID tag 40 transmits all data to the route information unit 20. It is calculated in the calculation unit 23 which of the received data is to be output. The calculated route information is output via the display unit 22.

It is obvious that in this example the route information units 20 do not need to be networked, which accordingly reduces the costs.

Using the system according to the present invention, it is possible to provide individually optimized information for multiple individuals in a differentially structured area cost-effectively.

The invention claimed is:

1. A method for displaying route information for an individual within a predetermined area, the method comprising the following steps:
    wirelessly transmitting a two-dimensional barcode to an identification apparatus for identifying the individual, the identification apparatus having a display unit for displaying the two-dimensional barcode;
    identifying the individual by interpreting the two-dimensional barcode and establishing at least one destination to which the individual is to be guided;
    detecting the individual at at least one route information unit by reading the two-dimensional barcode from the display unit; and
    displaying first route information about a further route of the individual to the at least one destination,
    wherein the identification of the individual is performed via input in a contactless way of the two-dimensional barcode, and
    wherein the first route information is automatically derived from personal data obtained by the identification of the individual.

2. The method according to claim 1, wherein the individual is additionally measured biometrically during the identification.

3. The method according to claim 1, wherein the route information is stored in the identification apparatus.

4. The method according to claim 1, wherein the route information is stored centrally for a plurality of individuals.

5. The method according to claim 1, wherein after the individual has reached the at least one destination, second route information is displayed, the second route information relating to a return route of the individual.

6. The method according to claim 1, wherein the first route information is displayed graphically or is output acoustically.

7. A system for displaying route information for individuals within a predetermined area, the system comprising:
    a central unit storing information about topography of an area;
    multiple route information units provided at orientation points and comprising display units and communication interfaces, the communication interfaces comprising:
        communication interface read units, and
        assignment units; and
    at least one identification unit comprising an identification unit read unit able to read a two-dimensional barcode wirelessly to identify an individual by interpreting the two-dimensional barcode and input a destination, the at least one identification unit having a display unit for displaying the two-dimensional barcode;
    wherein the multiple route information units are implemented for a purpose of detecting the individual by reading the two-dimensional barcode from the display unit of the at least one identification unit;

wherein the display units of the multiple route information units display information about a further route of the individual to the destination after detection of the individual;

wherein the communication interface read units can read two-dimensional barcodes in a contactless manner; and wherein the assignment units derive the route information automatically from personal data obtained by identification of the individual.

8. The system according to claim 7, wherein the at least one identification unit also has a measuring unit implemented for a purpose of biometrically measuring individuals; and wherein the multiple route information units have recognition units, the recognition units recognizing individuals on a basis of biometric data.

9. The system according claim 7, wherein the at least one identification unit further comprises a memory for the route information for the individual.

10. The system according to claim 7, wherein the central unit comprises a memory for the route information for a plurality of individuals.

11. The system according to claim 7, wherein the assignment units derive the route information automatically from personal data obtained by legitimization of the individual.

12. The system according to claim 7, wherein the multiple route information units display route information relating to a return route of the individual after the individual has reached the destination.

13. The system according to claim 7, wherein the multiple route information units can graphically display the route information and/or can acoustically output the route information.

* * * * *

UNITED STATES PATENT AND TRADEMARK OFFICE
CERTIFICATE OF CORRECTION

PATENT NO. : 8,624,970 B2  Page 1 of 1
APPLICATION NO. : 11/659874
DATED : January 7, 2014
INVENTOR(S) : Thomas Krobath It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1807 days.

Signed and Sealed this

Twenty-second Day of September, 2015

Michelle K. Lee
*Director of the United States Patent and Trademark Office*